(12) United States Patent
Bostick et al.

(10) Patent No.: US 9,442,644 B1
(45) Date of Patent: Sep. 13, 2016

(54) DISPLAYING CONTENT BASED ON VIEWING DIRECTION

(71) Applicant: International Business Machines Corporation, Armonk, NY (US)

(72) Inventors: James E. Bostick, Cedar Park, TX (US); John M. Ganci, Jr., Cary, NC (US); Sarbajit K. Rakshit, Kolkata (IN); Craig M. Trim, Sylmar, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/084,575

(22) Filed: Mar. 30, 2016

Related U.S. Application Data

(63) Continuation of application No. 14/825,293, filed on Aug. 13, 2015.

(51) Int. Cl.
*G09G 5/00* (2006.01)
*G06F 3/0484* (2013.01)
*G06F 3/01* (2006.01)

(52) U.S. Cl.
CPC .......... *G06F 3/04842* (2013.01); *G06F 3/013* (2013.01)

(58) Field of Classification Search
None
See application file for complete search history.

(56) References Cited

U.S. PATENT DOCUMENTS

| | | | |
|---|---|---|---|
| 5,796,426 A | 8/1998 | Gullichsen et al. | |
| 8,723,798 B2 | 5/2014 | Vernacchia | |
| 8,823,741 B2 | 9/2014 | Lee et al. | |
| 2011/0279666 A1 | 11/2011 | Strömbom et al. | |
| 2011/0310006 A1 | 12/2011 | Edwards et al. | |
| 2012/0060177 A1 | 3/2012 | Stinson, III et al. | |
| 2014/0002486 A1 | 1/2014 | Ratcliff et al. | |
| 2014/0063052 A1 | 3/2014 | Choi | |
| 2014/0075349 A1* | 3/2014 | Yun | G06F 3/013 715/764 |

FOREIGN PATENT DOCUMENTS

| | | |
|---|---|---|
| WO | 2008012717 A2 | 1/2008 |
| WO | 2009011846 A2 | 1/2009 |
| WO | 2014003509 A1 | 1/2014 |
| WO | 2014003981 A1 | 1/2014 |

OTHER PUBLICATIONS

Wikipedia, The Free Encyclopedia, "Refractive index," https://en.wikipedia.org/wiki/Refractive_index, Aug. 8, 2015, pp. 1-17.
Molecular Expressions, "Refraction of Light," http://micro.magnet.fsu.edu/optics/lightandcolor/refraction.html, Aug. 1, 2003, pp. 1-6.
Kitaro 10: Let Your Kitaro Flow, "Creative & Awesome Transparent Screen Trick Photos," http://www.kitaro10.com/inspiration/creative-awesome-transparent-screen-trick-photos/, printed on Aug. 10, 2015, pp. 1-15.

(Continued)

*Primary Examiner* — Ilana Spar
*Assistant Examiner* — Kirk Hermann
(74) *Attorney, Agent, or Firm* — Kristofer L. Haggerty; John Pivnichy

(57) ABSTRACT

A computer detects a person in an environment. The computer determines a view direction of the person. The computer displays content relevant to the determined view direction of the person.

1 Claim, 5 Drawing Sheets

(56) References Cited

OTHER PUBLICATIONS

Avidan et al, "Seam Carving for Content-Aware Image Resizing," SIGGRAPH2007, http://www.faculty.idc.ac.il/Arik/SCWeb/imret/index.html, printed on Feb. 18, 2015, pp. 1-4.
Wikipedia, The Free Encyclopedia, "Seam carving," https://en.wikipedia.org/wiki/Seam_carving, Apr. 15, 2015, pp. 1-7.
Bostick et al., "Displaying Content Based on Viewing Direction," U.S. Appl. No. 14/825,293, filed Aug. 13, 2015.
List of IBM Patents or Patent Applications Treated as Related, signed Mar. 28, 2016, 2 pgs.

* cited by examiner

DISPLAYING CONTENT BASED ON VIEWING DIRECTION

TECHNICAL FIELD

The present invention relates to displaying content, and more particularly to displaying content based on viewing direction.

BACKGROUND

In the digital age, people desire for information to be available at their fingertips at all times. The invention of the Internet has made it possible for a person to, within seconds, utilize a search engine to find and learn almost anything. This has been furthered with the arrival of the smartphone, which has allowed user to gain access to almost any information no matter their location. Smart watches, glasses, and other products have helped further satisfy this thirst for real-time access to information.

SUMMARY

The present invention provides a method, system, and computer program product for determining a view direction of a user. A computer detects a person in an environment. The computer determines a view direction of the person. The computer displays content relevant to the determined view direction of the person.

DETAILED DESCRIPTION

Embodiments of the present invention will now be described in detail with reference to the accompanying Figures.

Figure 1:
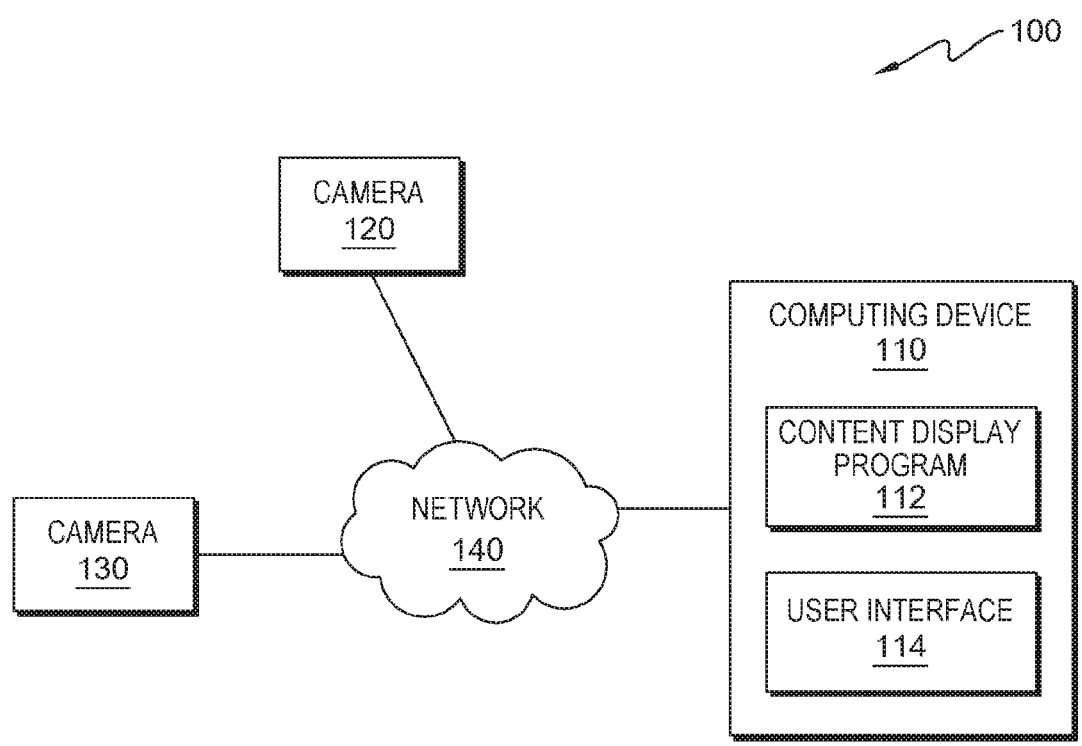
FIG. 1 illustrates a display system, in accordance with an embodiment of the invention.

FIG. 1 illustrates display system 100, in accordance with an embodiment of the invention. In an exemplary embodiment, display system 100 includes computing device 110, camera 120, and camera 130 all interconnected via network 140.

Camera 120 is a computing device that is capable of taking videos and/or photographs of an environment. In the example embodiment, camera 120 is capable of zooming in and zooming out in order to fully capture an object in an environment. In addition, in the example embodiment, camera 120 is capable of detecting an object, such as a person, entering an environment by way of utilizing one or more motion detectors.

Camera 130 is a computing device that is capable of taking videos and/or photographs of an environment. In the example embodiment, camera 130 is capable of zooming in and zooming out in order to fully capture an object in an environment. In addition, in the example embodiment, camera 130 is capable of detecting an object, such as a person, entering an environment by way of utilizing one or more motion detectors.

Computing device 110 includes content display program 112 and user interface 114. Computing device 110 may be a desktop computer, a notebook, a laptop computer, a tablet computer, a handheld device, a smart-phone, a thin client, or any other electronic device or computing system capable of receiving and sending data to and from other computing devices, such as camera 120 and camera 130, via a network, such as network 140. Although not shown, optionally, computing device 110 can comprise a cluster of web devices executing the same software to collectively process requests. In the example embodiment, computing device 110 also includes a transparent display, such as a window, which one or more users may interact with using, for example, a gesture or hand motion. Furthermore, in other embodiments, computing device 110 may include one or more hard wired cameras rather than being connected to one or more cameras via a network. Computing device 110 is described in more detail with reference to FIG. 3.

User interface 114 includes components used to receive input from a user and transmit the input to an application residing on computing device 110. In the example embodiment, user interface 114 uses a combination of technologies and devices, such as device drivers, to provide a platform to enable users of computing device 110 to interact with content display program 112. In the example embodiment, user interface 114 receives input, such as input received via a gesture, hand motion or interaction with a transparent display (which functions similar to a touch screen).

Content display program 112 is a program capable of utilizing camera 120 and camera 130 in order to capture images of one or more people in an environment. In the example embodiment, content display program 112 is capable of determining a view direction for each of the one or more people in the environment. Furthermore, in the example embodiment, content display program 112 is capable of displaying content on a display, such as a transparent display, based on the view direction. The operations and functions of content display program 112 are described in more detail with reference to FIG. 2.

Figure 2:
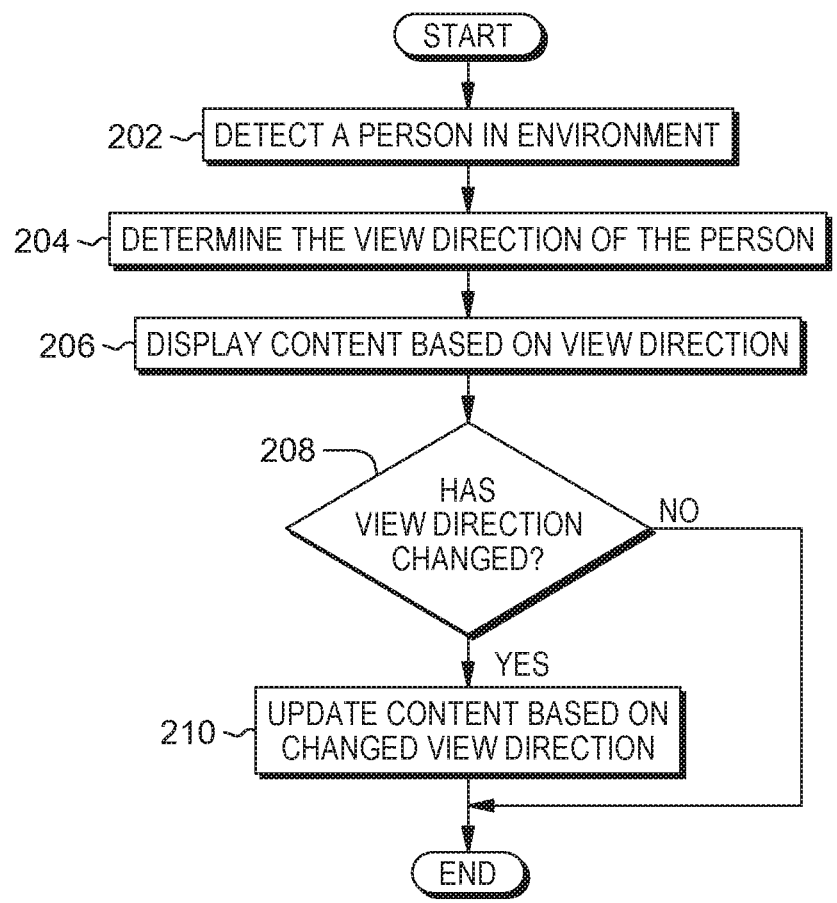
FIG. 2 is a flowchart illustrating the operations of the content display program of FIG. 1, in accordance with an embodiment of the invention.

FIG. 2 is a flowchart illustrating the operations of content display program 112 in determining a view direction of one or more people in an environment and displaying content based on the view direction, in accordance with an embodiment of the invention. In the example embodiment, content display program 112 detects a person in an environment (step 202). In the example embodiment, content display program 112 utilizes camera 120 and/or camera 130 to detect a person (or more than one person) in the environment. In further embodiments, content display program 112 may utilize motion detecting sensors, infrared sensors or other detecting mechanisms to detect a person in the environment.

Content display program 112 determines the view direction of the person detected in the environment (step 204). In the example embodiment, content display program 112 determines a view direction of the person(s) by utilizing geometric principles in order to determine an object or an area that the person is viewing. In the example embodiment, where computing device 110 includes a transparent display, such as a window, if the person is looking out the window at an object or an area, content display program 112 may utilize geometric principles to determine an object or an area that the person is viewing while accounting for the thickness of the glass/material of window by factoring in a light refraction analysis. For example, content display program 112 may utilize a camera, such as camera 120, that is closest in proximity to the person, to determine the direction of the gaze of the person with respect to the transparent display. Content display program 112 then takes into account the refractive index of the material to adjust the viewing angle (with respect to the transparent display). Additionally, another camera(s) may be utilized in order to validate the determined direction of the gaze of the person. This analysis will be described in further detail below with regard to FIG. 3.

In further embodiments, content display program 112 may utilize eye/gaze tracking technology in order to determine the view direction of the person. For example, if a special lens or film is affixed to the cornea of the person, content display program 112 may communicate with the special lens via network 140 in order to determine the view direction. The special lens or film may include precise position sensors to follow physical movements of the eye. In addition, a tiny mirror or electromechanical transducer may be embedded in the special lens or film, with the mirror/transducer using light beams or electromagnetic fields to quantify the eye's orientation and follow changes in the gaze position.

In even further embodiments, eye position and movement may be detected without the use of attachments to the cornea. For example, content display program 112 may utilize a microprojector to transmit an infrared beam at the eye, with the reflection patterns being picked up by a set of sensors. In this embodiment, the reflections may occur from the cornea or from the retina as the infrared beam passes through the lens, into the eye, and back out.

Content display program 112 displays content based on the determined view direction (step 206). In the example embodiment, where computing device 110 includes a transparent display, such as a window, content display program 112 may display the content in an area on the transparent display so that the person(s) may view the content while looking through the transparent display. In addition, in embodiments where more than one person is detected in the environment, content display program 112 may display content in areas of the transparent display relevant to each person. For example, if the view direction of a first person is focused on a first building, while the view direction of the second person is focused on a downtown hotel, content display program 112 may display content relevant to the first building on an area of the transparent display that is within close proximity to the first person, while simultaneously displaying content relevant to the downtown hotel on an area of the transparent display that is within close proximity to the second person. Furthermore, in the example embodiment, a user/person may manipulate the displayed content by way of a gesture, hand motion, utilization of a keyboard/touchscreen, and/or other type of user input. For example, a user/person may use an upward hand motion to scroll down through the content. In addition, in the example embodiment, content display program 112 may display the relevant content for a specific period of time, as set by an administrator.

Content display program 112 determines whether the view direction of the person(s) detected in the environment has changed (decision 208). In the example embodiment, content display program 112 determines whether the view direction of the person(s) detected in the environment has changed by utilizing cameras (such as camera 120 and camera 130) to track the person(s) gaze in the same manner as described above. If content display program 112 determines that the view direction of the person(s) detected in the environment has not changed (decision 208, "NO" branch), content display program 112 does not take any additional steps and continues displaying the relevant content.

If content display program 112 determines that the view direction of the person(s) detected in the environment has changed (decision 208, "YES" branch), content display program 112 determines the updated view direction of the person(s) in the same manner as described above and updates the display (transparent display) so that content relevant to the focus of the updated view direction is displayed (step 210).

Figure 3:
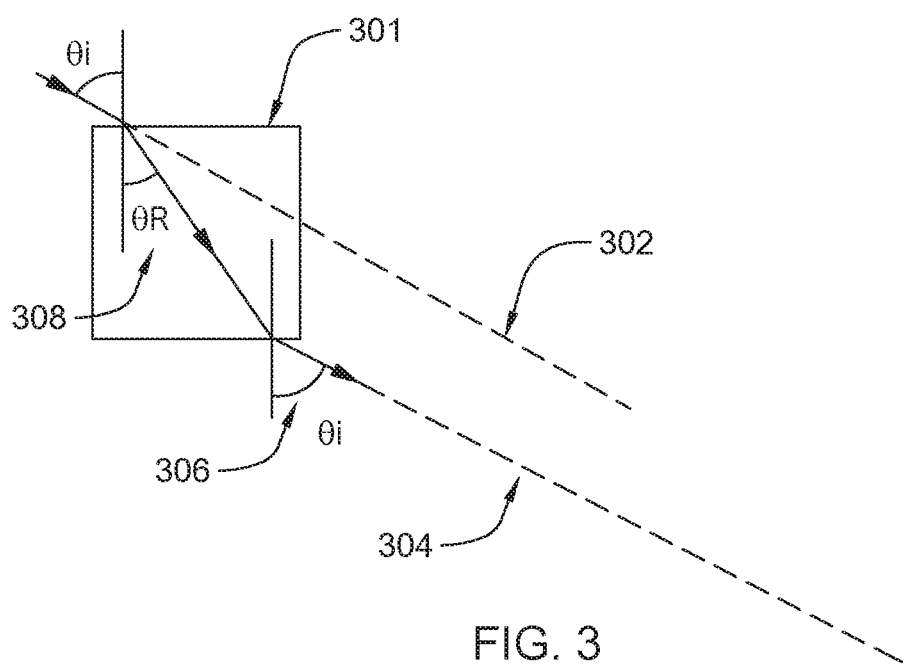
FIG. 3 is an illustration of the determination of a view direction, in accordance with an embodiment of the invention.

FIG. 3 is an illustration of the determination of a view direction of an individual, in accordance with an embodiment of the invention. In the example embodiment, FIG. 3 depicts a focus of an individual based on view direction information determined by utilizing camera 120 and/or camera 130. Extrapolation 302 represents a simple extrapolation of the focus of an individual without taking refraction into account (i.e., refractive index of material that transparent display 301 is composed of). Angle of incidence 306($\theta_i$) represents the angle of incidence of the view direction while, angle of refraction 308($\theta_R$) represents the angle of refraction, taking into account the material that transparent display 301 is composed of. In the example embodiment, the angle of incidence may be determined by utilizing geometric techniques from information retrieved by utilizing camera 120 and/or camera 130. In order to determine the angle of refraction, the equation below may be utilized:

$$n_i \sin(\theta_i) = n_r \sin(\theta_r) \tag{1}$$

Therefore, for an environment where a person(s) is looking through a transparent display $n_i$ represents the index of refraction of the incident medium (for example, air), and $n_r$ represents the index of refraction of the refractive medium (for example, glass). Once the angle of incidence is determined as described above, the angle of refraction may be determined by utilizing equation 1.

Content display program 112 may then determine a point of focus through the transparent display 301, by way of factoring in the angle of refraction, and also factoring in the thickness of transparent display 301.

Figure 4:
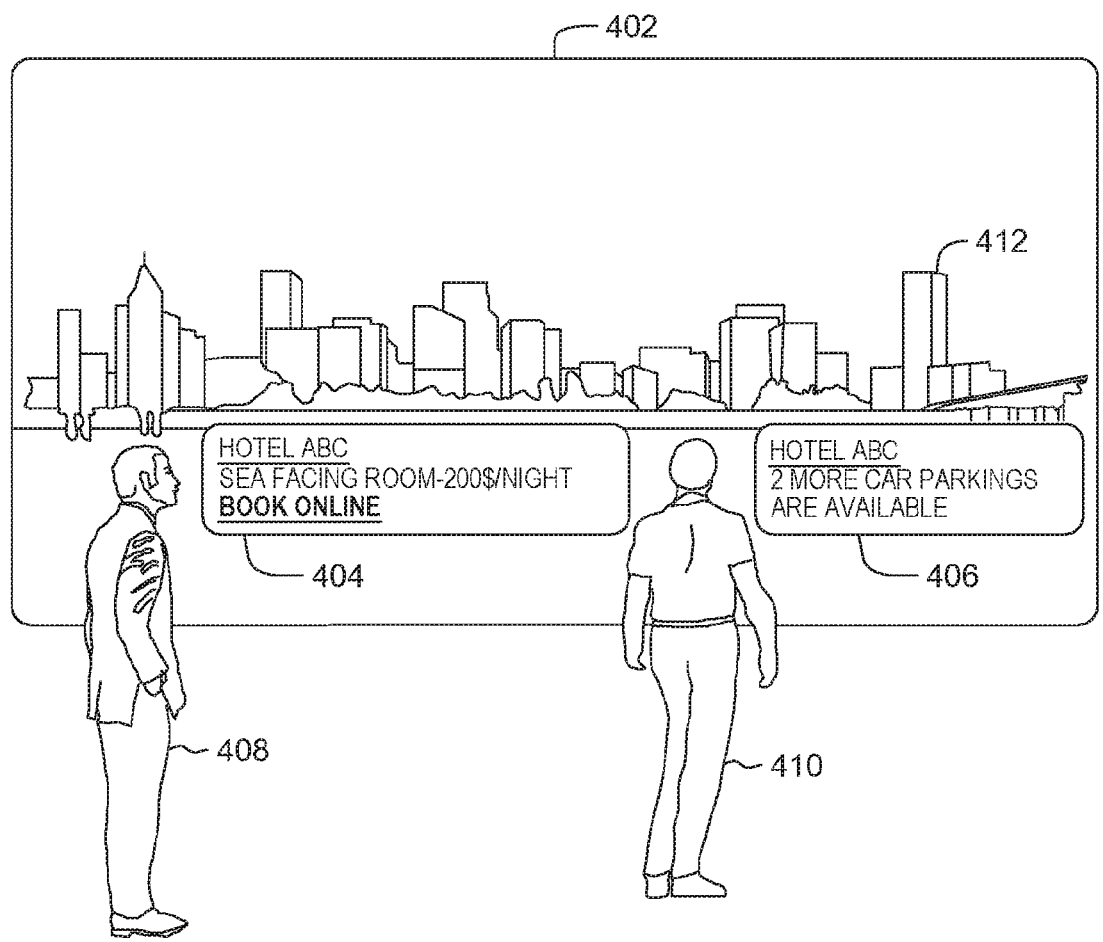
FIG. 4 is an illustration of relevant content being displayed on a transparent display, in accordance with an embodiment of the invention.

FIG. 4 is an illustration of relevant content being displayed on a transparent display, in accordance with an embodiment of the invention. In the example embodiment, both users 408 and 410 are focused on the same object 412. Therefore, after determining the focus of each user, content display program 112 displays information relevant to object 412 on transparent display 402, as displayed by information 404 and information 406. In the example embodiment, as stated above, content display program 112 determines the focus (view direction) of a user and then displays information relevant to the user, however, content display program 112 may also determine the focus of all users in the environment prior to displaying relevant information on transparent display 402.

The foregoing description of various embodiments of the present invention has been presented for purposes of illustration and description. It is not intended to be exhaustive nor to limit the invention to the precise form disclosed. Many modifications and variations are possible. Such modifications and variations that may be apparent to a person skilled in the art of the invention are intended to be included within the scope of the invention as defined by the accompanying claims.

Figure 5:
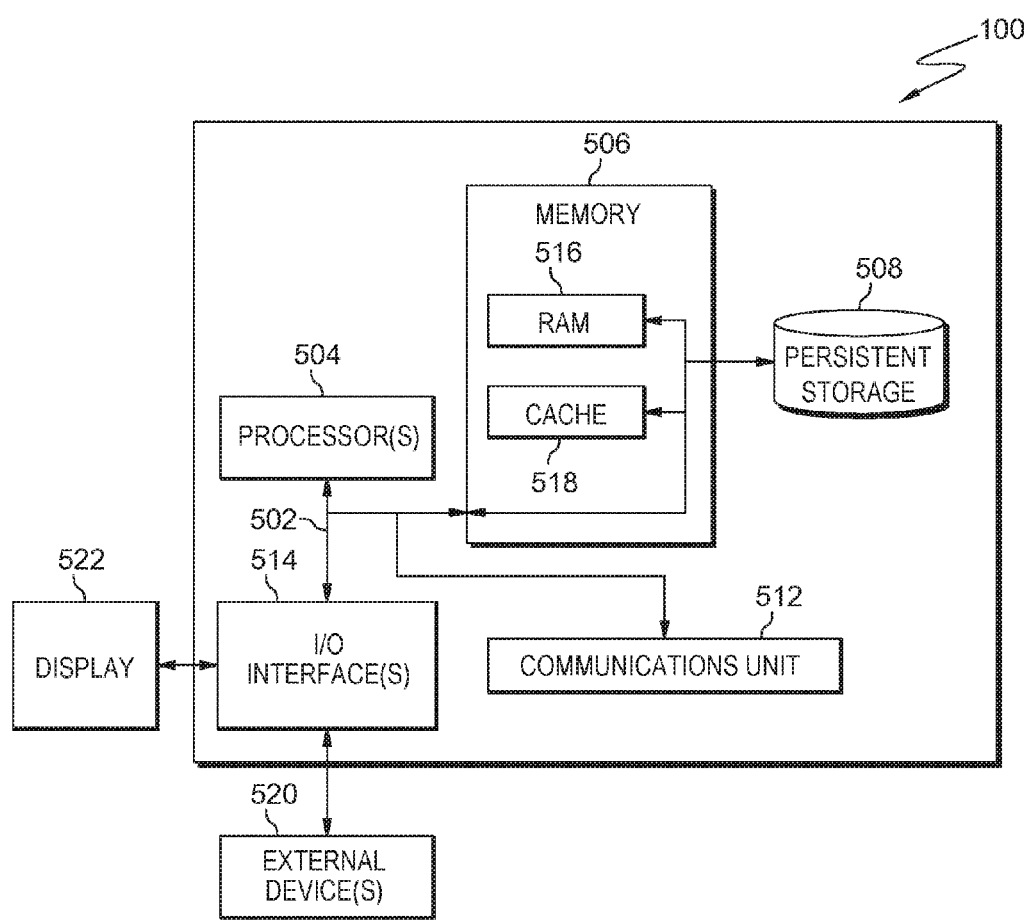
FIG. 5 is a block diagram depicting the hardware components of the display system of FIG. 1, in accordance with an embodiment of the invention.

FIG. 5 depicts a block diagram of components of computing device 110, camera 120, and camera 130 of display system 100 in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Computing device 110, camera 120, and camera 130 include communications fabric 502, which provides communications between computer processor(s) 504, memory 506, persistent storage 508, communications unit 512, and input/output (I/O) interface(s) 514. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM) 516 and cache memory 518. In general, memory 506 can include any suitable volatile or non-volatile computer-readable storage media.

Content display program 112 and user interface 114 in computing device 110 may be stored in persistent storage 508 for execution by one or more of the respective computer processors 504 via one or more memories of memory 506. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer-readable storage medium that is also part of persistent storage 508.

Communications unit 512, in these examples, provides for communications with other data processing systems or devices. In these examples, communications unit 512 includes one or more network interface cards. Communications unit 512 may provide communications through the use of either or both physical and wireless communications links. Content display program 112 and user interface 114 in computing device 110 may be downloaded to persistent storage 508 through communications unit 512.

I/O interface(s) 514 allows for input and output of data with other devices that may be connected to computing device 110, camera 120, and camera 130. For example, I/O interface 514 may provide a connection to external devices 520 such as, a keyboard, keypad, a touch screen, and/or some other suitable input device. External devices 520 can also include portable computer-readable storage media such as, for example, thumb drives, portable optical or magnetic disks, and memory cards. Software and data used to practice embodiments of the present invention, e.g., content display program 112 and user interface 114 in computing device 110, can be stored on such portable computer-readable storage media and can be loaded onto persistent storage 508 via I/O interface(s) 514. I/O interface(s) 514 can also connect to a display 522.

Display 522 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature. The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge devices. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or device. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for determining a view direction of a user, comprising the steps of:
   a computer detecting a person in an environment by utilizing motion detecting sensors and infrared sensors;
   based on detecting a person in the environment:
      determining an angle of incidence, wherein determining an angle of incidence further comprises utilizing a microprojector which transmits an infrared beam to an eye of the person, and utilizing a set of sensors to pick up the reflection patterns;
      determining an angle of refraction based on an index of refraction of a transparent display;
      determining a view direction of the person based on the determined angle of incidence, the determined angle of refraction, and a thickness of the transparent display; and
   the computer displaying content relevant to the determined view direction of the person.

* * * * *